July 3, 1951  A. R. DICKSCHAT  2,559,284
AIR FILTER FOR BEER PUMP PRESSURE SYSTEMS
Filed July 26, 1949
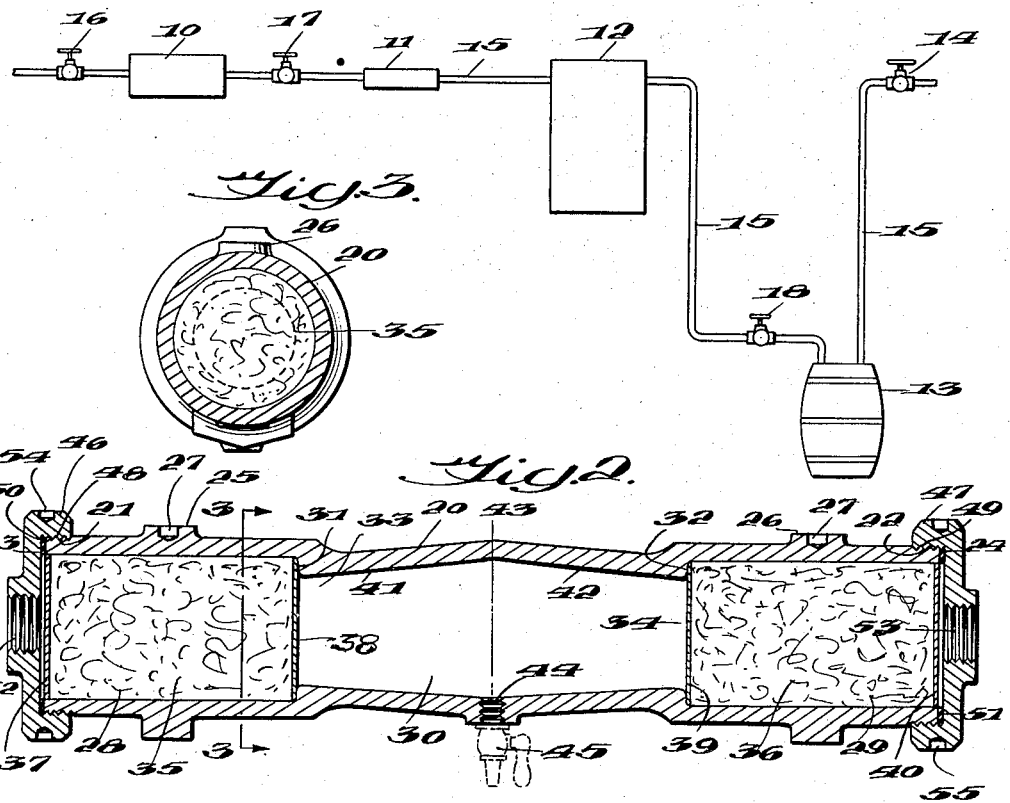
INVENTOR.
ALBERT R. DICKSCHAT,
BY
Parry & Miller
ATTORNEYS Patented July 3, 1951

2,559,284

UNITED STATES PATENT OFFICE 2,559,284

AIR FILTER FOR BEER PUMP PRESSURE SYSTEMS

Albert R. Dickschat, Struthers, Ohio

Application July 26, 1949, Serial No. 106,850

3 Claims. (Cl. 183—45)

This invention relates to an air filter for beer pump pressure systems and aims generally to provide an improved device of this type for removing moisture, oil, dirt, and other particles from the air used in such systems.

In the dispensing of draft beer from barrels or the like air under pressure is forced into the barrels of beer and drives the beer from the cellar to the dispenser in the tap room. In systems generally used for this purpose an air compressor takes air from the atmosphere and forces it into a reserve tank from which it passes through a suitable hose or the like to the barrel of beer. Suitable valves are provided where needed and usually include a Thomas valve positioned between the reserve tank and the barrel of beer, and designed to keep dirt that may get through from the air compressor from getting into the barrel and to keep the beer from backing up from the tap into the air hose if the air compressor fails.

Atmospheric air contains a certain amount of moisture, dust, and other foreign matter which is taken into the compressor with the air and discharged therefrom to the reserve tank. There the water tends to stagnate and this stagnant water and air, when forced into the barrel by pressure on the line, gives the beer a disagreeable taste, makes it unsanitary, and causes it to lose collar.

After the air compressor has been in use for several months and the rings in the air compressor body begin to wear, it allows a certain amount of oil seepage to be forced under pressure into the reserve tank. This oil when forced out of the reserve tank into the barrel causes beer to lose its carbonation and go flat when served. Also the oil forced under pressure through the rubber Thomas valve causes it to rot so that the valve becomes useless and thus allows dirt and other particles to get into the barrel. The air hose is also affected by this oil in that it makes the hose gummy and in time causes it to rot.

A primary object of the invention is the provision of an improved air filter for beer dispensing systems which will prevent undesired foreign matter from reaching the beer to cause disagreeable taste and odor, loss of collar, loss of carbonation and the like.

A further object of the invention is the provision of an improved filter which will save wear and tear on Thomas valves, air hoses and air valves by preventing oil, water, dirt, and other foreign matter from reaching them.

A still further object of the invention is the provision of an improved filter for beer pump pressure systems, which will remove moisture from atmospheric air, absorb oil and collect other impurities which may be present in atmospheric air, including dust and other types of foreign matter.

Another object of the invention is the provision of a filtering device for air in which the air is subjected to a plurality of filtering operations through fibrous filtering material and an intervening treatment comprising a gradual expansion and contraction of the air as it passes through the device.

Still another object of the invention is the provision of an improved air filter in which air under pressure is first passed through a filtering chamber containing a mass of fibrous filtering material, then passed through a chamber which gradually increases in cross-sectional area to a point intermediate the ends thereof to permit the air to expand and decrease in velocity and then gradually decreases in cross-sectional area to contract the air and cause it to speed up and then passed through a second filtering chamber containing a mass of fibrous filtering material to complete the removal of impurities.

A further object of the invention is the provision of an improved filter device for air which is of simple but durable construction and which may be readily assembled and disassembled for cleaning and the like.

These and other objects and advantages of the invention will be apparent to persons skilled in the art from a consideration of the attached drawing and annexed specification illustrating and describing a preferred embodiment of the invention.

In the drawing:

Fig. 1 is a diagrammatic view of a beer dispensing system embodying the invention;

Fig. 2 is a longitudinal cross-sectional view of the improved filter device;

Fig. 3 is a vertical cross-sectional view of the device taken on the line 3—3 of Fig. 2; and, Fig. 4 is a longitudinal cross-sectional view of a portion of a modified form of the device.

Referring now to the drawing and particularly to Fig. 1 there is illustrated a beer dispensing system comprising an air compressor 10, a filter 11, a reserve tank 12, a beer barrel 13 and a tap 14 connected in series by tubing or hose 15. Inlet and outlet valves 16 and 17 are provided for the air compressor 10 and a Thomas valve 18 is provided in the line between the reserve tank 12 and the beer barrel 13. Atmospheric air is drawn into the compressor 10 through the intake valve 16 and is forced under pressure through outlet valve 17 and filter 11 to the reserve tank 12. From the reserve tank 12 air under pressure passes through the hose 15 and Thomas valve 18 into the beer barrel 13, the pressure of air in the barrel 13 causing the beer therein to flow upwardly through hose 15 to the tap 14. In the system shown all foreign matter in the air such as moisture, oil, dirt, and the like is removed by the filter 11 so that the air entering the barrel 13 is fresh, clean, and pure so as not to deleteriously affect the beer.

Referring more particularly to Figs. 2 and 3 the filter 11 comprises an elongated tubular body member 20 formed of suitable metallic material and having threaded ends 21 and 22 to receive the end closure caps 23 and 24. The body member 20 is preferably formed in one piece as a single unitary member though it may, if desired, be formed as two complementary parts suitably secured together at their ends as by screw-threaded engagement as shown in Fig. 4. Projections 25 and 26 may be formed on the body member 20 adjacent the ends thereof and provided with spaced openings 27 for the reception of a spanner wrench or similar type of tool.

Interiorly adjacent the ends thereof the body member 20 is formed with a pair of substantially identical open-ended filtering chambers 28 and 29 spaced apart by an intermediate chamber 30 to be described more particularly hereinafter. At their inner ends the chambers 28 and 29 are formed with inwardly extending annular shoulders 31 and 32 which define the inner ends of the filter chambers and form restricted openings 33 and 34 into the intermediate chamber 30. Bodies of suitable fibrous filtering material 35 and 36, such as felt or the like are disposed in the chambers 28 and 29 and retained therein by the foraminated disc screens 37, 38 and 39, 40. The screens 38 and 39 seat against the annular shoulders 31 and 32 and the screens 37 and 40 bear against and are held in place by the end caps 23 and 24.

The intermediate chamber 30 constitutes an expansion chamber and is formed with oppositely disposed divergent walled sections 41 and 42 which gradually increase in cross-sectional area from the restricted openings 33 and 34 inwardly to their plane of intersection 43 located substantially centrally of the body member 20. A drain opening 44 is provided for the chamber 30 adjacent the enlarged central portion thereof and has a petcock 45 to permit withdrawal of moisture, oil, sediment and the like.

The ends of the body member 20 and of the filtering chambers 28 and 29 are closed by the end caps 23 and 24 which have flanged peripheral portions 46 and 47 threaded interiorly as at 48 and 49 for engagement with the threaded ends 21 and 22 of the body member 20. Rubber gaskets 50 and 51 are desirably mounted between the ends of the body member 20 and the inner faces of the end caps 23 and 24 to provide fluid-tight joints. Substantially centrally thereof the caps 23 and 24 are provided with threaded openings 52 and 53 designed to receive the threaded ends of pipes 15 for connecting the filter into the system. To facilitate employment of a spanner wrench or like type of tool the flanged peripheral portions 46 and 47 of the end caps may be provided with spaced openings 54 and 55.

In the operation of the system above described air under pressure from the air compressor 10 enters the filter device 11 through the inlet opening 52. During passage of the air through the fibrous filtering material 35 and the foraminous screens 37 and 38 a substantial portion of the foreign material such as dust, dirt, oil, and the like is removed from the air and retained in the filtering material. As the partially purified air passes through the restricted opening 33 and along the divergent walled sections 41 and 42 there is a further separation of the foreign matter carried by the air and particularly the entrained moisture, such separated materials collecting in the lower part of the central enlarged portion of the device from which they may be drained at desired intervals by opening the petcock 45. The chamber 30 is quite effective in the separation of undesired foreign material such as moisture from the air due perhaps in large part to the gradual expansion of the air and decrease in velocity as it passes therethrough.

As the air passes from the chamber 30, freed of a substantial portion of the foreign material originally present therein when it entered the filter, it passes through the second filtering chamber 29 where any remaining foreign material in the air such as dirt, oil, and the like is removed by the filtering material 36.

The purified air from the filter 11 then enters the reserve tank 12 from which it passes to the beer barrel 13 through the hose 15 and Thomas valve 18. Since the air is substantially free of the impurities which cause wear and deterioration of the hose and valves and undesirable taste and loss of carbonation and the like in the beer these deleterious effects will not be present and the beer will issue from the tap 14 in substantially the condition it had in the barrel 13 prior to the introduction of the air thereinto.

In Fig. 4 I have shown a slightly modified form of the filter 11 in which the elongated tubular body member 20 is made up in two sections 60 and 61. The sections 60 and 61 may be joined together in any suitable manner such as the screw-threaded connection 62. In this embodiment of the invention the intermediate elongated chamber 63 is formed by the divergent walled sections 64 and 65, the peripheral walls of the section 64 having a somewhat greater angle of divergency than the walls of the section 65. This results in the section 64 being somewhat shorter than the section 65 so that the air is subjected to a more rapid expansion and a slower compression than in the embodiment previously described. Also in the embodiment of Fig. 4 the intermediate enlarged section 66 is somewhat longer than in the previous case and has straight walls 67 to facilitate collection of foreign matter removed from the air. A drain 68 controlled by a petcock 69 is provided as before.

The embodiment of the invention shown in Fig. 4 operates substantially the same and produces similar improved results as in the embodiment first described.

Various modifications of the invention described and illustrated will most likely occur to those skilled in the art to which the invention relates and may be made without departing from the spirit of the invention, the scope of which is indicated in the attached claims.

I claim:

1. A combination air filter and moisture trap for beer pump pressure systems comprising an elongated tubular container, removable end closure members for said container provided with inlet and outlet connections, spaced filtering chambers in said container adjacent the ends thereof, fibrous filtering material disposed in said chambers, an elongated chamber in said container intermediate said filtering chambers, the surrounding wall of said chamber diverging uniformly from one of said filtering chambers to an intermediate portion of maximum diameter and then converging uniformly from said portion of maximum diameter to the other of said filtering chambers, and a valved drain connected to said intermediate portion of maximum diameter.

2. A combination air filter and moisture trap for beer pump pressure systems comprising an elongated tubular container and closure members for said container having inlet and outlet openings therein, spaced filtering chambers in said container having inwardly extending annular shoulders at the inner ends thereof defining restricted openings of smaller size than said filtering chambers, foraminous discs in said filtering chambers seated against said annular shoulders, fibrous filtering material disposed in said filtering chambers outwardly of said foraminous discs, an elongated chamber in said container intermediate said filtering chambers and communicating therewith through said restricted openings, the confining wall of said chamber diverging uniformly from one of said restricted openings to an intermediate portion of maximum diameter and then converging uniformly from said portion of maximum diameter to the other of said restricted openings, and a drain connected to said intermediate portion of maximum diameter.

3. A device of the character set forth in claim 1 in which the divergent wall of the container makes a greater angle with the longitudinal axis of the tubular container than the convergent wall.

ALBERT R. DICKSCHAT.

REFERENCES CITED

The following references are of record in the file of this patent:

UNITED STATES PATENTS

| Number | Name | Date |
|---|---|---|
| 24,551 | Fontain | June 28, 1859 |
| 609,493 | Beutelspacher | Aug. 23, 1898 |

FOREIGN PATENTS

| Number | Country | Date |
|---|---|---|
| 497,315 | Germany | Dec. 16, 1930 |